US010684832B2

(12) United States Patent
Ottoni

(10) Patent No.: US 10,684,832 B2
(45) Date of Patent: Jun. 16, 2020

(54) CODE PLACEMENT USING A DYNAMIC CALL GRAPH

(71) Applicant: Facebook, Inc., Menlo Park, CA (US)

(72) Inventor: Guilherme de Lima Ottoni, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 213 days.

(21) Appl. No.: 15/436,722

(22) Filed: Feb. 17, 2017

(65) Prior Publication Data

US 2017/0161038 A1    Jun. 8, 2017

Related U.S. Application Data

(63) Continuation of application No. 14/489,904, filed on Sep. 18, 2014, now Pat. No. 9,612,807.

(51) Int. Cl.
*G06F 9/44* (2018.01)
*G06F 8/41* (2018.01)
*G06F 9/448* (2018.01)
*G06F 16/901* (2019.01)
*G06F 12/0875* (2016.01)
*G06F 12/1027* (2016.01)

(52) U.S. Cl.
CPC ............ *G06F 8/443* (2013.01); *G06F 9/4486* (2018.02); *G06F 16/9024* (2019.01); *G06F 12/0875* (2013.01); *G06F 12/1027* (2013.01); *G06F 2212/1021* (2013.01); *G06F 2212/684* (2013.01)

(58) Field of Classification Search
CPC ...................................................... G06F 8/443

USPC ........................................................ 717/157
See application file for complete search history.

(56) References Cited

U.S. PATENT DOCUMENTS 5,450,535 A * 9/1995 North .................... G06T 11/206
                                                          345/440
6,175,957 B1 * 1/2001 Ju ........................... G06F 8/4442
                                                          717/156

(Continued)

OTHER PUBLICATIONS

Kim et al., "Demand Paging Techniques for Flash Memory Using Compiler Post-Pass Optimizations", Nov. 2011, ACM Transactions on Embedded Computing Systems, vol. 10, No. 4, Article 40. (Year: 2011).*

(Continued)

*Primary Examiner* — Qamrun Nahar
(74) *Attorney, Agent, or Firm* — FisherBroyles, LLP

(57) ABSTRACT

When a program function is called, if the instructions for that function are not in active memory, a page fault occurs. Resolving a page fault includes a costly process of loading a page of object code instructions, into active memory, including the instructions for the called function. Technology is disclosed to reduce page faults by placing interrelated functions near each other within executable code based on a log of previous function calls. A log of function calls may be from observing the execution of applications over time. Computing devices can compute where to place functions within executable code by: obtaining the function call log; building a call graph based on the function call log; defining multiple node clusters within the call graph; and generating an ordered list of functions by sorting the node clusters. The ordered list of functions can then be provided during linking to determine function placements.

20 Claims, 7 Drawing Sheets

(56) References Cited

U.S. PATENT DOCUMENTS

| | | | | |
|---|---|---|---|---|
| 9,047,399 B2* | 6/2015 | Grunberg | | G06F 11/3466 |
| 9,612,807 B2 | 4/2017 | Ottoni et al. | | |
| 2005/0044538 A1* | 2/2005 | Mantripragada | | G06F 8/443 |
| | | | | 717/151 |
| 2008/0092121 A1* | 4/2008 | DeRose | | G06F 11/3409 |
| | | | | 717/125 |
| 2011/0173199 A1* | 7/2011 | Heisig | | G06F 11/3409 |
| | | | | 707/737 |
| 2011/0320785 A1* | 12/2011 | Chen | | G06F 9/3806 |
| | | | | 712/233 |
| 2012/0096440 A1* | 4/2012 | Tateishi | | G06F 9/4482 |
| | | | | 717/126 |
| 2012/0226749 A1* | 9/2012 | Dale | | G06Q 50/01 |
| | | | | 709/204 |
| 2013/0262659 A1* | 10/2013 | Parthasarathy | | H04L 41/5083 |
| | | | | 709/224 |
| 2013/0272162 A1* | 10/2013 | Li | | H04W 24/06 |
| | | | | 370/254 |
| 2014/0208296 A1* | 7/2014 | Dang | | G06F 8/75 |
| | | | | 717/123 |
| 2016/0085527 A1 | 3/2016 | De Lima | | |
| 2017/0262309 A1* | 9/2017 | Crowther | | G06F 9/485 |
| 2018/0137139 A1* | 5/2018 | Bangalore | | H04L 67/2842 |

OTHER PUBLICATIONS

Pettis et al., "Profile Guided Code Positioning", Jun. 1990, ACM, Jun. 1990. (Year: 1990).*
Non-Final Office Action dated Apr. 20, 2016, for U.S. Appl. No. 14/489,904 by Ottoni, G., et al., filed Sep. 18, 2014.
Non-Final Office Action dated Oct. 22, 2015, for U.S. Appl. No. 14/489,904 by Ottoni, G., et al., filed Sep. 18, 2014.
Notice of Allowance dated Dec. 16, 2016, for U.S. Appl. No. 14/489,904 by Ottoni, G., et al., filed Sep. 18, 2014.
U.S. Appl. No. 14/489,904 by Ottoni, G., et al., filed Sep. 18, 2014.

* cited by examiner

CODE PLACEMENT USING A DYNAMIC CALL GRAPH

CROSS-REFERENCES TO RELATED APPLICATIONS

This application is a continuation of U.S. patent application Ser. No. 14/489,904, filed on Sep. 18, 2014, and entitled "CODE PLACEMENT USING A DYNAMIC CALL GRAPH," the disclosure of which is hereby incorporated herein in its entirety by reference.

BACKGROUND

Computing systems have become integrated into nearly every human activity. Everything from driving our cars to sharing photos with friends occurs with at least some assistance from computing systems. These computing systems, are controlled by vast amounts of computer instructions. As both the diversity of actions that can be performed by computing systems and the number of processing requests for each of these actions increase, there is an ever greater demand for processing power. For example, social networking sites have attracted billions of active users all sharing links, requesting pages, and sending messages. At any given time, millions of page requests can occur contemporaneously, e.g. when users visit various Web pages, e.g. "timelines" of their friends or other users.

Furthermore, for each action taken on a computing system, hundreds of functions may be called. Each function call can require a determination of whether the instructions for that function have already been loaded into active memory. When the functions are not in active memory, a comparatively slow process must be performed to retrieve them from storage. Due to the sheer volume of functions to be executed, especially in large distributed applications such as social networking sites, various latencies can be experienced due to the instruction retrieval process. These latencies can make the computing systems appear to be sluggish, and users may simply navigate to a different web site if they are frustrated by the slowness.

DETAILED DESCRIPTION

Figure 1:
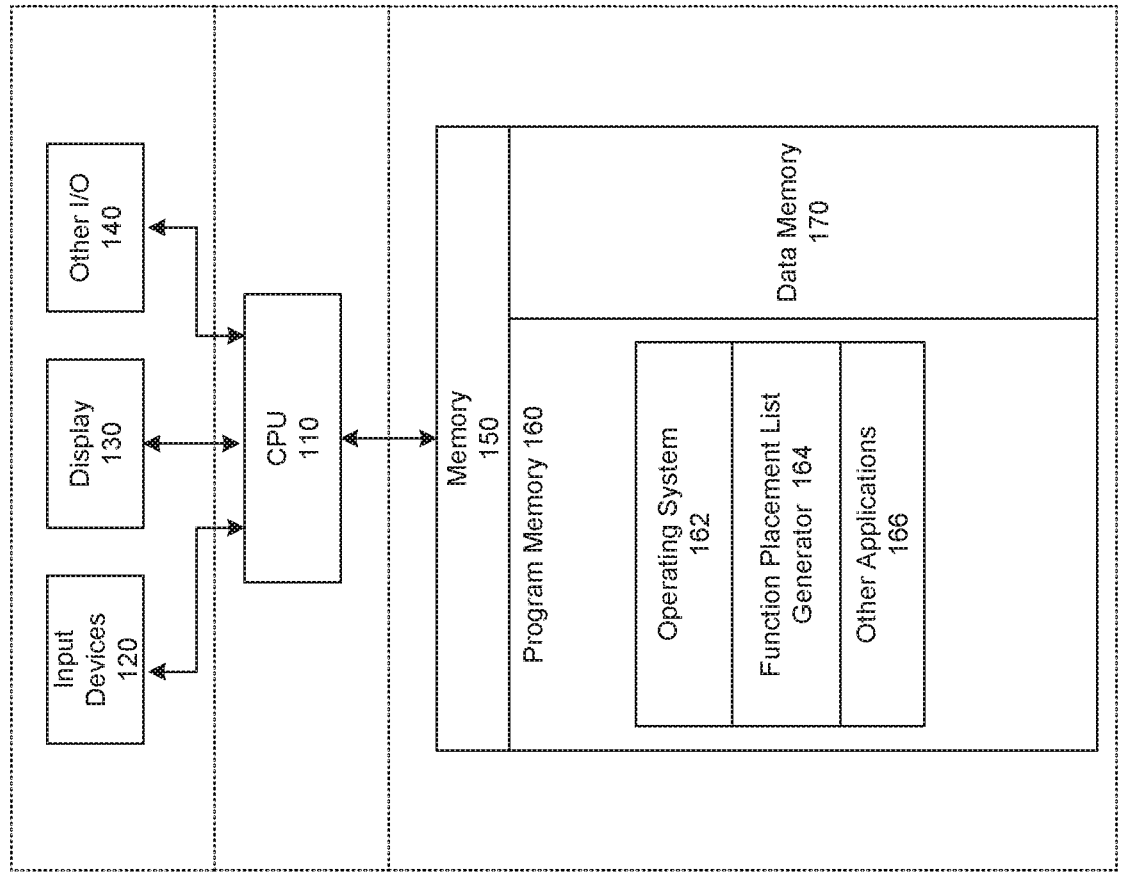
FIG. 1 is a block diagram illustrating an overview of devices on which some embodiments of the disclosed technology can operate.

Computer programs are often written in a form that is easily recognizable by humans, known as source code. A compiler is a program that transforms source code into object code, which is a series of binary segments where each segment indicates to a processor a particular action to take. Computer programs are often written with additional identifiers that define groups of instructions, referred to as functions or methods, such that the defined instruction groups can be performed with a single call instruction. When a program function is called, the instructions for that function are loaded from storage memory, such as a disk, into active memory, such as random access memory (RAM).

In some computing systems, blocks of instructions, comprising the instructions for the called function and additional instructions in the object code "near" the called function, are loaded into an area of active memory. These blocks of instructions comprising the called function and any additional instructions are referred to as "pages;" the process for checking whether a called function is in active memory and if not, clearing a portion of the active memory and retrieving the page including the called function is known as "paging;" and a state in paging in which a called function is not already in active memory is known as a "page fault." The size of a page is generally set either in hardware or software. Additional instructions are sufficiently "near" the instructions for a called function to be included in the block of instructions when the instructions for a called function do not fill an entire page and there is room in the page for instructions from the object code before, after, or before and after the instructions for a called function. Active memory is generally much faster than storage memory such as a disk. By loading additional instructions beyond just the instructions of the called function, if another function is called whose instructions are already loaded into active memory, the comparatively slow processes of loading instructions into active memory can be avoided, thereby improving execution efficiency.

Part of a process of transforming source code into an executable format such as a library, dynamically linked library (dll), or executable, includes linking. Linking includes resolving symbols in the object code which indicate, in part, how function calls should be handled. Linking may also include analyzing code to organize frequently used or interrelated functions to be in the same or adjacent pages. This increases the likelihood that, when a calling function calls another function, the called function might already be in memory because it was stored on the same page as the calling function. By placing functions that are likely to call each other on the same page of object code, a function call is less likely to produce a costly page fault.

In addition, as a program executes, memory is accessed using memory addresses. In many computing systems, the process of utilizing memory addresses involves translating virtual address into physical addresses. This memory management process of translating virtual addresses can use a Translation Lookaside Buffer ("TLB"), sometimes implemented as a cache available to the processor. In some instances, the TLB is not large enough to hold all the virtual to physical memory translations. When a virtual address is accessed that is not in the TLB, TLB miss handling is performed to load additional TLB entries. A TLB miss is handled by checking the page table for a corresponding physical address correspondence, and if such an address correspondence is not located, a page fault occurs. Thus, by placing functions that are likely to call each other near each other in object code, virtual address translations are also more likely to be in the TLB, thereby avoiding TLB misses and page faults.

In addition to the TLB, another type of cache that improves program execution performance is an instruction cache. An instruction cache is a very fast memory situated between the processor and the main memory. Groups of program instructions can be loaded into the instruction cache. As execution progresses, a mechanism keeps track of which instruction to execute next according to a sequence of instructions and jump instructions. The next indicated instruction to execute is loaded first by checking the instruction cache, and if the requested instruction is not in the instruction cache, a block of instructions comprising the requested instruction is brought into the instruction cache from the object code in main memory. Thus again, having instructions likely to be in sequence near each other in the object code decreases the frequency of the need to perform loads of instruction blocks into the instruction cache.

The organization of functions within object code based on an analysis of the code, however, does not account for factors such as user input, randomization, network latency, the type of computing devices that are executing the program, and other factors external to the object code which affect which functions call other functions and how often those functions are called. However, it is not necessary for the process of compiling code to be deterministic based on a static analysis of the code. Technology is disclosed herein for determining placement of functions within executable code based on a log of previous function calls.

A log of function calls may be recorded by observing the execution of one or more applications over a period of time. As programs are run, a portion of the system memory can be observed, referred to herein as "profiling data," to log information such as which functions were called, which functions called each called function, how many instructions were run to complete each function call, and how much time was spent within each function. In some systems, such as server-side web-based applications, this logging can be performed by observing execution without adding extra instrumentation instructions to the executed code. This log can be analyzed regularly to then reorganize executable code.

As discussed in more detail below in relation to FIGS. 3-7, a computing device can compute where to place functions within executable code by: obtaining a function call log; building a call graph based on the function call log; defining multiple node clusters within the call graph; and generating a, ordered list of functions by sorting the node clusters. The ordered list of functions can then be provided to a linking process to make corresponding placements of functions.

Several embodiments of the described technology are discussed below in more detail in reference to the figures. Turning now to the figures, FIG. 1 is a block diagram illustrating an overview of devices 100 on which some embodiments of the disclosed technology may operate. The devices can comprise hardware components of a device 100 that determine function placement within executable code. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, the display includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, function placement list generator 164, and any other application programs 166. Memory 150 also includes data memory 170 that can include pages of stored function instructions, function call log data, call graph data, function cluster data, ordered lists of functions, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
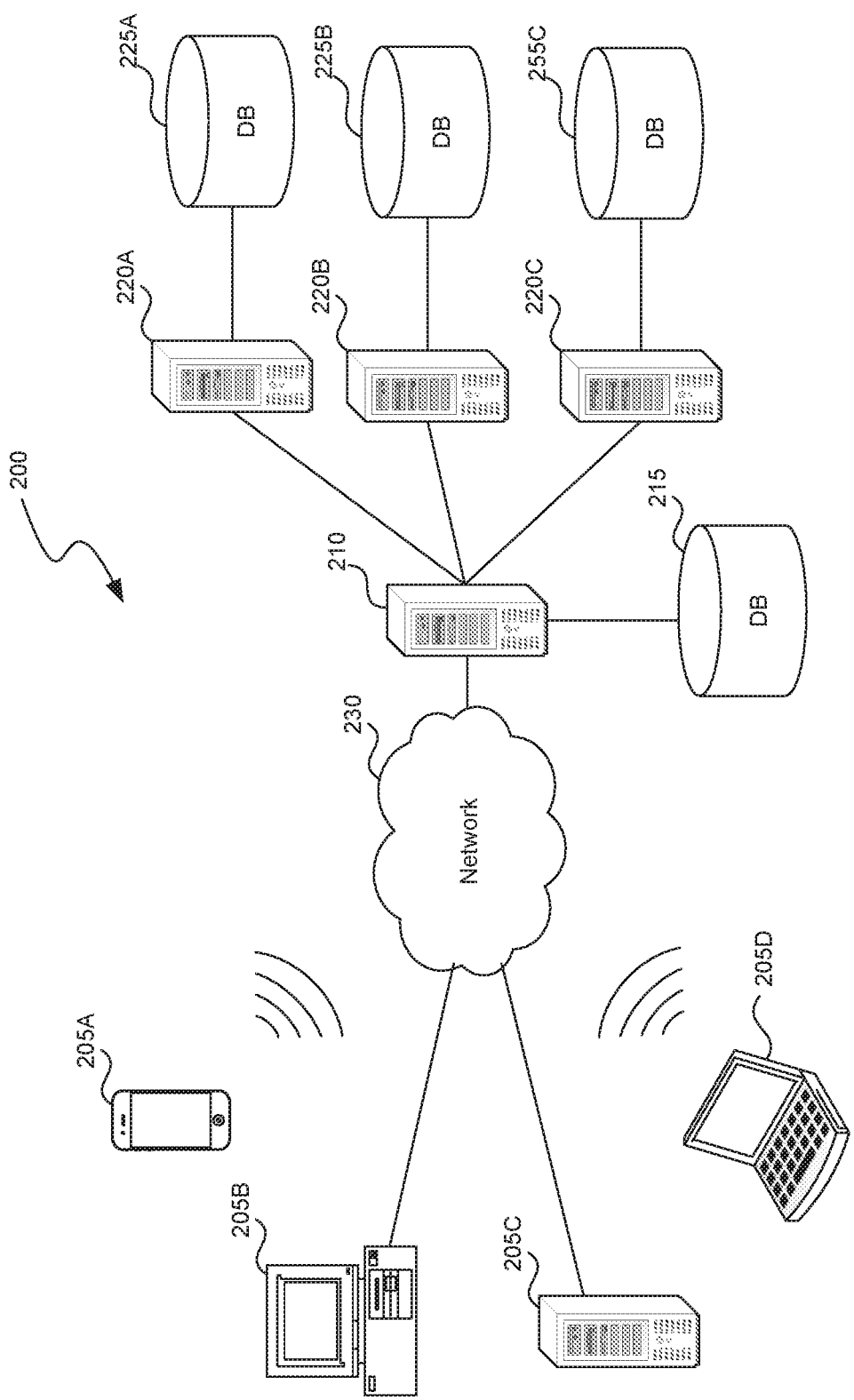
FIG. 2 is a block diagram illustrating an overview of an environment in which some embodiments of the disclosed technology can operate.

FIG. 2 is a block diagram illustrating an overview of an environment 200 in which some embodiments of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as function call log data, call graph data, and ordered lists of functions. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
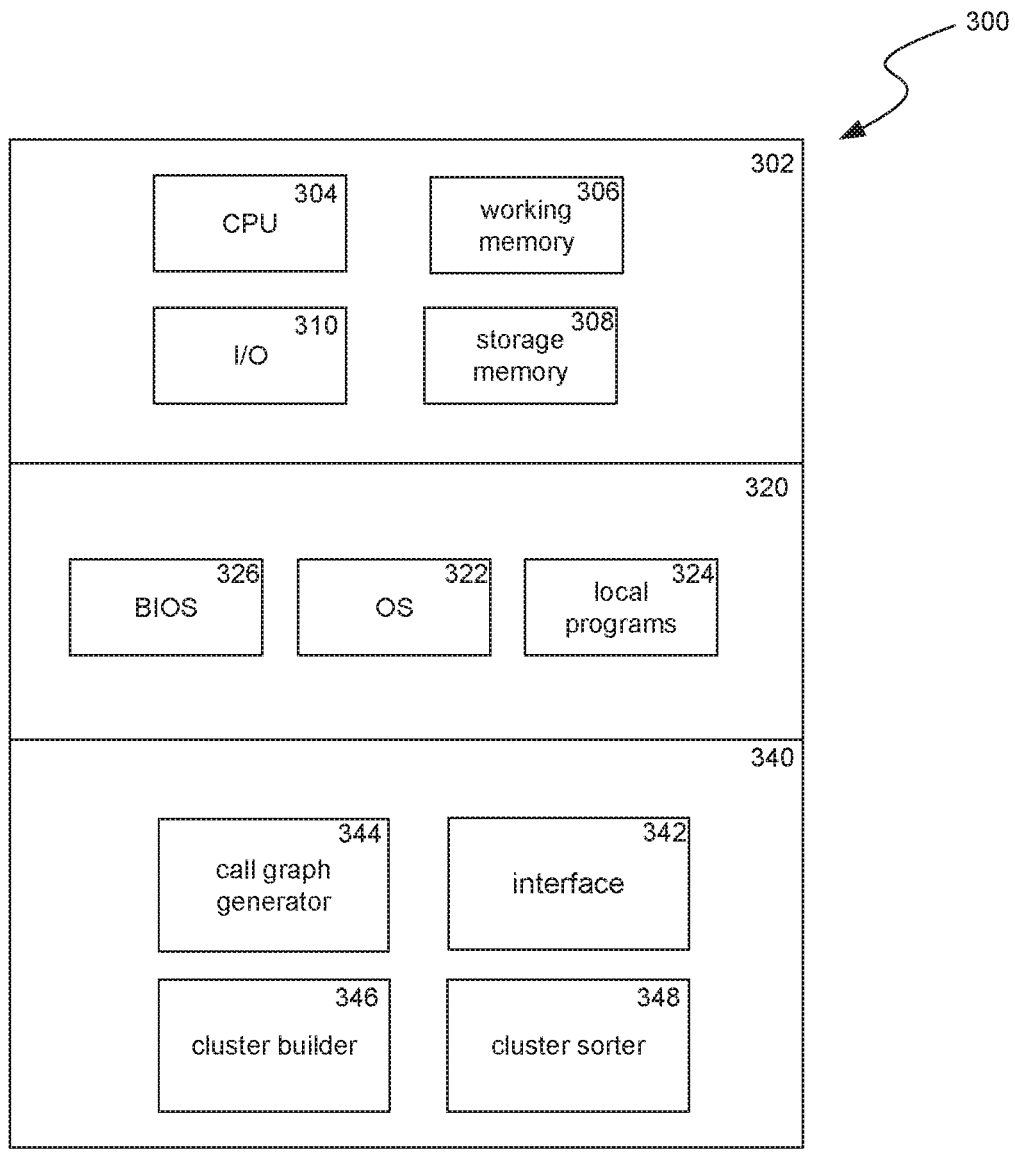
FIG. 3 is a block diagram illustrating components which, in some embodiments, can be used in a system implementing the disclosed technology.

FIG. 3 is a block diagram illustrating components 300 which, in some embodiments, can be used in a system implementing of the disclosed technology. The components 300 include hardware 302, general software 320, and specialized components 340. As discussed above, a system implementing the disclosed technology can use various hardware including a central processing unit 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include call graph generator 344, cluster builder 346, cluster sorter 348, and components which can be used for controlling and receiving data from the specialized components, such as interface 342.

After a procedure is started to select function placement, a function call log can be passed from a storage system through interface 342 to call graph generator 344. A function call log may comprise indications of individual called functions and a corresponding caller function that performed the call of that called function. As used herein, such an indication between a called function and a caller function is referred to as a "pair". The function call log may also comprise additional data regarding one or more called functions such as a number of executed instructions; individual, sum, average, or mean execution time; and other performance metrics. Call graph generator 344 can loop through the pairs in the function call log to generate a call graph. As call graph generator 344 loops through the function call log pairs, it can add nodes to the call graph for each caller and called node if they do not already exist on the call graph. As call graph generator 344 loops through the function call log pairs it can also A) add an edge from the node for the caller function indicated in that pair to the node for the called function indicated in that pair if no edge between these two nodes in this direction already exists, B) increment an edge weight for the edge from the node for the caller function indicated in that pair to the node for the called function indicated in that pair, and C) for the node corresponding to the called function of each pair, increment a node weight value indicating an amount of processing, such as in time, processor cycles, etc., used by the called function. Generating a call graph based on a log of function calls is discussed in more detail below in relation to FIG. 5.

Call graph generator 344 can pass a generated call graph to cluster builder 346. Cluster builder 346 can sort the nodes in the call graph according to each node's node weight. Cluster builder 346 can then loop through the sorted nodes, starting with the nodes with the highest node weight, to merge them into two or more clusters. As cluster builder 346 loops through the sorted nodes, the current node may be merged with another cluster A) that has another node with the highest edge weight starting from the other node to the current node and B) where a size value for the combination of the current node and the other cluster does not exceed a threshold. If no such other cluster exists, the current node may be set as a single node cluster. In some implementations, the threshold value is based on a size of pages used for executing the resulting code. In some implementations, the size value is a byte count of the functions corresponding to nodes in the combination. The computed value for the size of the functions resulting from a potential merging is referred to herein as the "total function size" of the resulting merged cluster. Building clusters within a call graph is discussed in more detail below in relation to FIGS. 6 and 7.

The indications of the clusters built by cluster builder 346 are passed to cluster sorter 348. Cluster sorter 348 assigns a cluster density to each cluster and sorts the clusters into a function list according to their cluster density, putting the higher density clusters first. Cluster sorter 348 can assign a cluster density to a cluster by dividing A) the average amount of time spent during an execution of the functions associated with nodes in that cluster by B) the number of instructions from the functions associated with nodes in that cluster. In some implementations, nodes within clusters may be sorted, such as by frequency, amount of time in each function, or other metrics. In other implementations the functions are not sorted within clusters as each cluster should fit within a single page, and thus the organization of functions within the cluster will not dramatically affect the frequency of page faults. Sorting clusters is discussed in more detail below in relation to FIGS. 4 and 7. The resulting function list can be passed from cluster 348 through interface 342 to a linker. In some implementations the list of clusters is provided from cluster builder 346 through interface 342 to the linker without sorting the list of clusters by cluster sorter 348. The linker can organize executable code such that functions indicated in the function list as adjacent have adjacent code in the executable.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
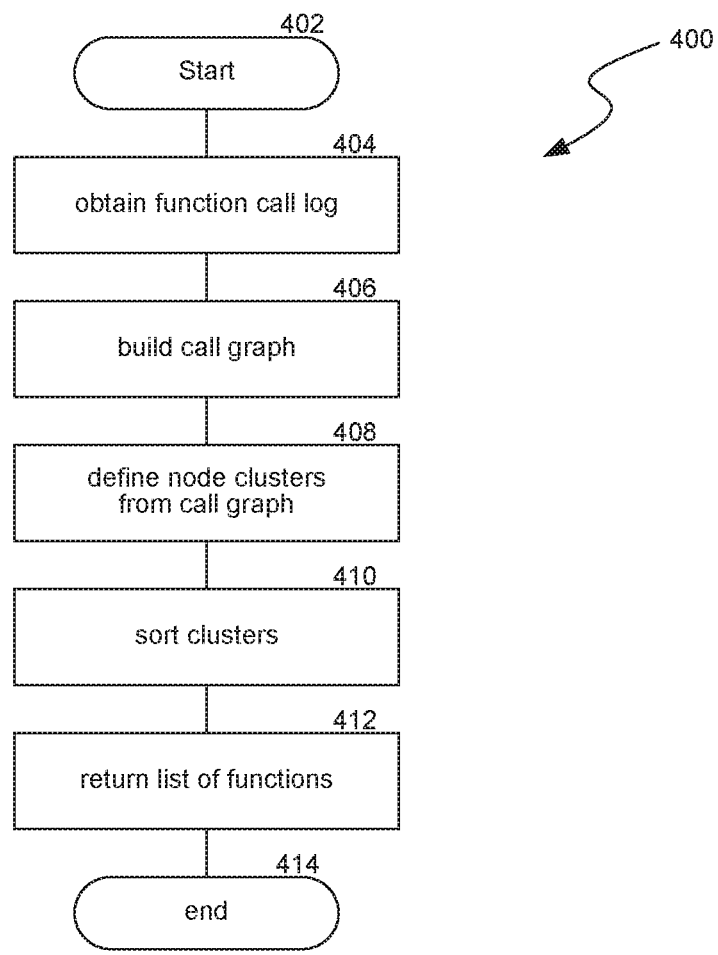
FIG. 4 is a flow diagram illustrating a process used in some embodiments for determining function placement within compiled code.

FIG. 4 is a flow diagram illustrating a process 400 used in some embodiments for determining function placement within compiled code. Process 400 starts at block 402 and continues to block 404.

At block 404 a function call log is obtained. A function call log may be recorded by observing the execution of one or more applications over a period of time. In some implementations, pairs of caller/called function identifications, as well as associated data, can be stored in a function call log by performing profiling on the computing device executing the functions. Profiling data such as which functions were called, which functions called each called function, how many instructions were run to complete each function call, and how much time was spent executing within each function can be logged. In some implementations other methods can be used to log function call data such as adding instrumentation code to executable code. The instrumentation code can be configured to take readings and send data to a logging module. The additional data in the function call log can also include information about the called functions such as a total number of instructions in the function; the number of instructions executed before the called function returns; individual, sum, average, or mean execution time, and other performance metrics. This additional information can be stored as data associated with each function call log pair, or may be aggregated into a set of data for each called function. In various implementations, the function calling can be obtained from a memory on a different computing system than the computing system performing process 400, such as a database storing memory profiling data, or may be obtained from a memory on the same computing system as the computing system performing process 400.

At block 406 process 400 where it uses the obtained function call log to build a call graph. A call graph may include nodes corresponding to functions and directed edges, where each directed edge starts from a node corresponding to a caller function that initiates a call to a called function and ends at the node corresponding to the called function. In various embodiments, call graphs may include data such as edge weights indicating the number of times a caller function called each called function, either as a count or relative measure such as a percentage; node weights indicating an amount of processing used by each function such as a measure of time, instructions, processor cycles, memory accesses, etc.; a size of each function, such as an instruction count or storage space used by the function; and/or information about the collection of the data such as a time frame during which the log the call graph is based on was formed. Additional details on building a call graph are discussed below in relation to FIG. 5.

At block 408 the clusters of nodes are defined within the call graph built in block 406. Clusters are groups of nodes which, based on the data in the call graph, are determined to be likely to call each other. By placing functions from the same cluster on the same page, some page faults may be avoided. In some implementations, clusters may be created based on a known size of the pages used by a system that will be executing the code once function placement has been determined. This may involve only adding a node to a selected cluster when a size of the function corresponding to the node to be added, when combined with the sizes of the functions corresponding to the nodes in the selected cluster, i.e. the total function size, does not exceed the known page size. In some implementations, selection of a particular node for a cluster can be based on a determination that an edge weight for an edge from that particular node to another node already selected for the cluster is higher than the weight for all other incoming edges for that other node already selected for the first cluster. In some implementations, a combination of these approaches may be used such that selection of particular nodes for a cluster is based on A) a determination that adding that particular node to the cluster will not increase a total function size value for that cluster above a threshold, such as a known size of a page; and B) a determination that an edge weight for an edge from that particular node to another node already selected for that cluster is higher than the edge weight for all other incoming edges for that other node that are from another node which would not increase a total function size value above the threshold. The result of defining node clusters may be a list of clusters or a list of functions organized by cluster. Additional details on defining node clusters within a call graph are discussed below in relation to FIGS. 6 and 7.

At block 410 the clusters defined in block 408 can be sorted based on factors such as the time expected to be used by executing the functions associated with the nodes in the cluster, the number of instructions that are included in the functions associated with the nodes in the cluster, other statistics about the functions associated with each cluster, or interactions between clusters. In some implementations, the clusters may be organized according to the likelihood that functions in one cluster will call functions in another cluster. This organization may be particularly useful where the page size is not known during cluster creation. Where this is the case, cluster boundaries may not correspond to page boundaries, so placing related clusters near each other will increase the likelihood that calling/called functions will be included in the same page. In some implementations, the clusters may be organized according to a cluster density value assigned to each cluster, with the higher cluster density value clusters first. Cluster density values can be assigned to each cluster by dividing A) the average amount of time spent during an execution of the functions associated with nodes in that cluster by B) the number of instructions from the functions associated with nodes in that cluster. In some implementations, the nodes within each cluster may also be sorted, such as based on their processing time, by placing functions likely to call each other together, or based on call frequency. The result of sorting the clusters may be a list of functions.

At block 412 the list of functions from block 410, or from 408 where block 410 is not performed, is returned for use in placing functions within executable code, such as by a linking process. Process 400 then continues to block 414 where it ends.

Figure 5:
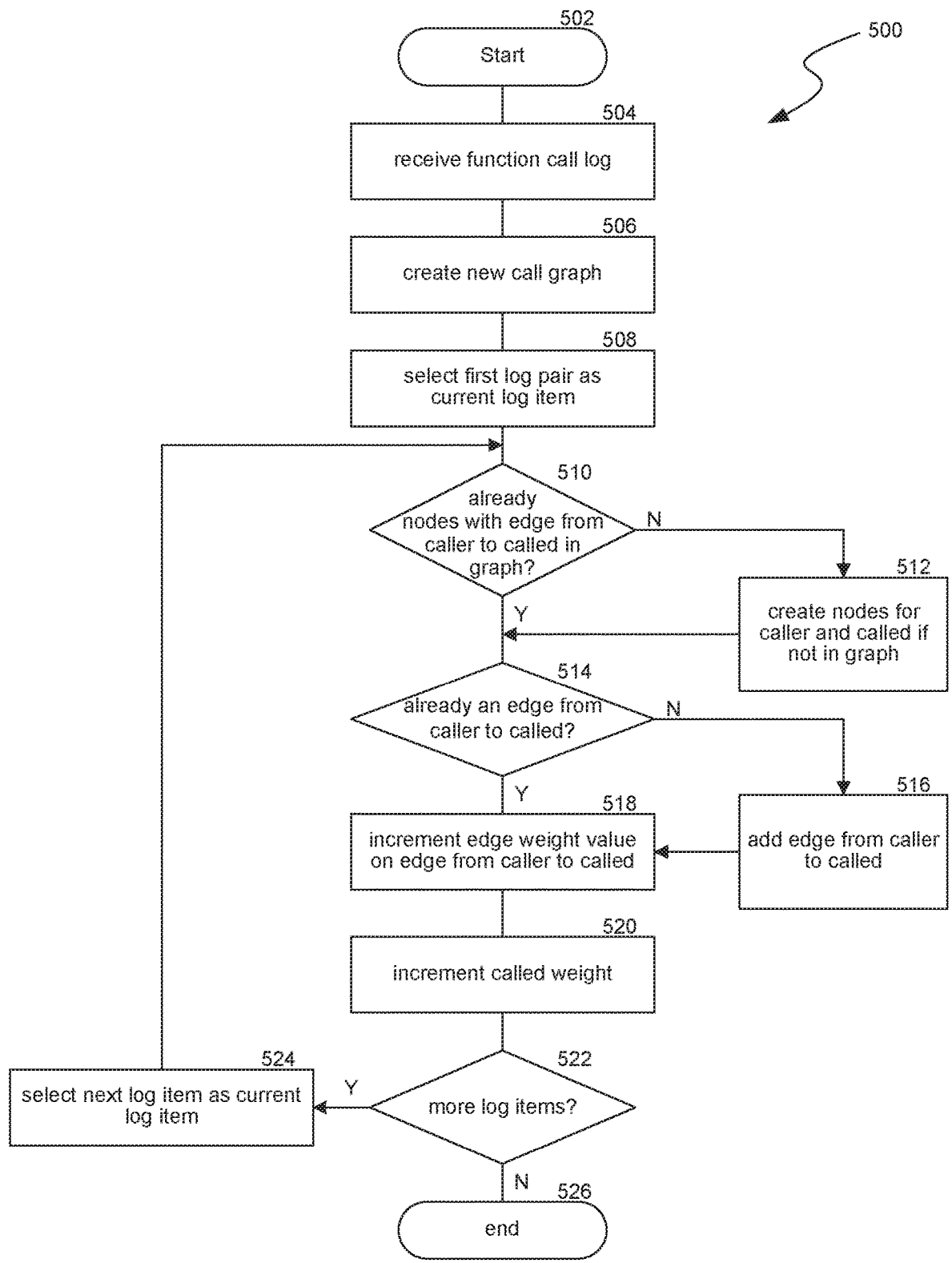
FIG. 5 is a flow diagram illustrating a process used in some embodiments for building a function call graph from a call log.

FIG. 5 is a flow diagram illustrating a process 500 used in some embodiments for building a function call graph from a function call log. Process 500 begins at block 502 and continues to block 504. At block 504 process 500 receives a function call log. At block 506 a new call graph is created. At block 508 the first caller/called function log pair is selected as a current log item.

At block 510 process 500 determines whether the call graph already has nodes for the caller function and the called function of the current log item. If not, process 500 continues to block 512 where a node for the caller function and a node for the called function are added if not already in the call graph. Each newly added node may be assigned a node weight value, which can be set to a default value, such as zero. Once the nodes are added in block 512, or if both nodes are found to already be in the call graph in block 510, process 500 continues to block 514.

At block 514 process 500 determines whether an edge exists from the node corresponding to the caller function in the current log item to the node corresponding to the called function in the current log item. If not, process 500 continues to block 516 where a directed edge from the node corresponding to the caller function in the current log item to the node corresponding to the called function is added to the call graph. New directed edges can have an initial edge weight value assigned to them which can be set to a default value, such as zero. Once the directed edge is added in block 516, or if the edge from the node corresponding to the caller function in the current log item to the node corresponding to the called function in the current log item is found to already exist in the call graph at block 514, process 500 continues to block 518.

At block 518 the edge weight value associated with the edge from the node corresponding to the caller function in the current log item to the node corresponding to the called function in the current log item is incremented. The edge weight value can be incremented to indicate a total count of calls by the caller function in the current log item to the called function in the current log item or may be incremented to indicate a relative value between all the functions that have called the called function, such as a percentage value.

Process 500 then continues to block 520 where it increases the node weight of a node associated with the called function in the current log item. The node weight may be increased to indicate an amount of processing consumed by the called function, such as a measure of processing time, processor cycles, etc.

Process 500 then continues to block 522 where it determines whether all the pairs in the function call log have been operated on by the loop between blocks 510 and 522. If not, process 500 continues to block 524 where it sets the next log pair as the current log item to be operated on by the loop between blocks 510 and 522. If all the function call log pairs have been operated on, process 500 continues to block 526, where it ends.

Figure 6:
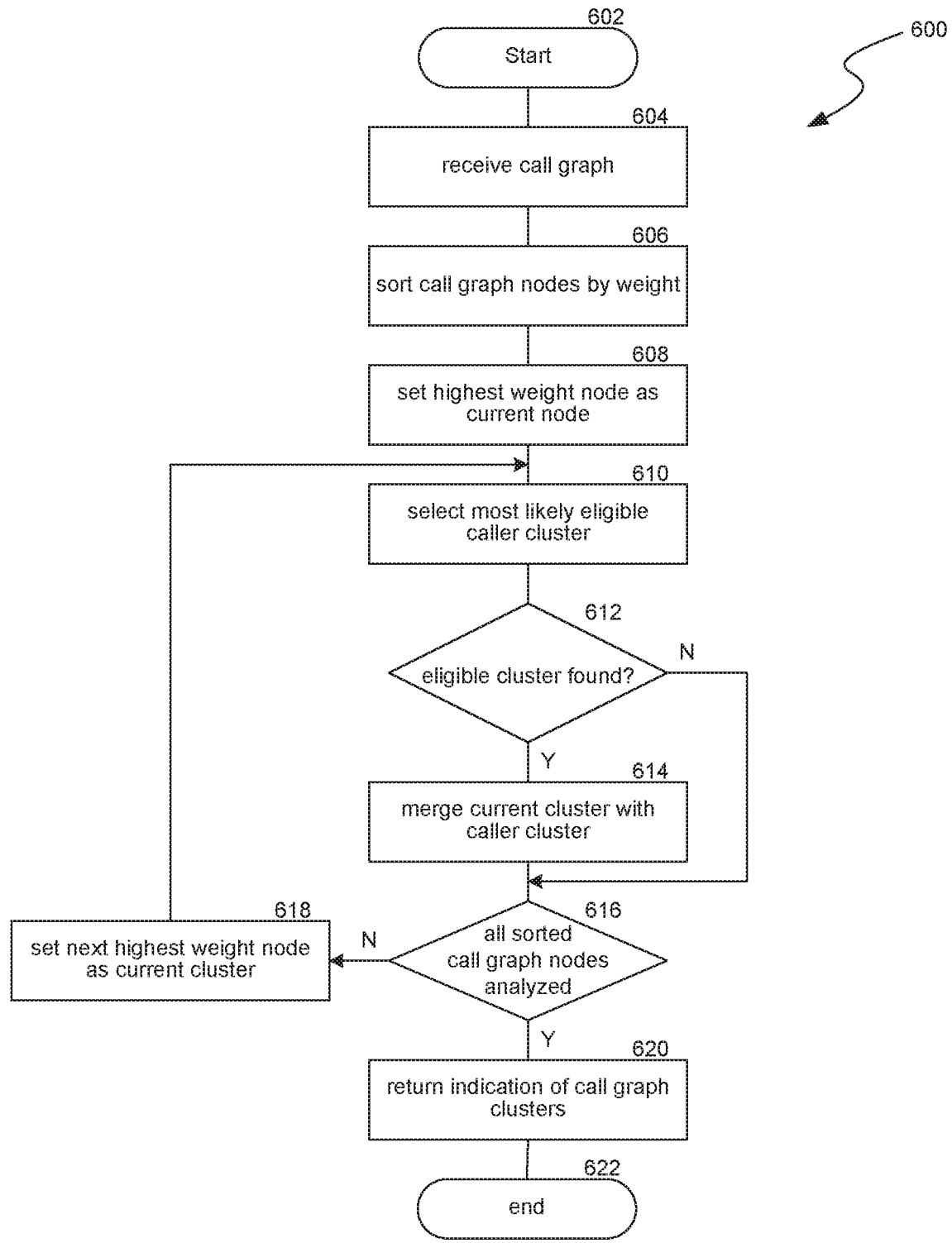
FIG. 6 is a flow diagram illustrating a process used in some embodiments for defining node clusters from a function call graph.

FIG. 6 is a flow diagram illustrating a process 600 used in some embodiments for defining node clusters from a function call graph. Process 600 starts at block 602 and continues to block 604. At block 604 a call graph is received. At block 606 the nodes of the call graph are sorted according to the node weight assigned to each node, with the higher weights first. Each node in the sorted order may be considered a single node cluster. At block 608 the highest weight node is set as the current node.

Between blocks 610 and 618 a loop is formed that iterates through each of the nodes in the sorted order to merge them into clusters. At block 610 an eligible cluster associated with the most likely caller function for the current node is selected, if there is one. Eligible clusters are the ones that, when the size of the functions corresponding to the nodes in that eligible cluster is added to the size of the functions in the cluster including the current node, the resulting total function size does not exceed a threshold, such as the size of a page. The most likely caller is determined by selecting the incoming edge from an eligible cluster or node with the highest edge weight.

In some implementations, as clusters are merged, the edges from all the nodes in that cluster going to the same other node are combined. For example, a call graph could have nodes A, B, C, and D, with an edge from A to B with a weight of 3, an edge from C to A with a weight of 1, an edge from C to B with a weight of 2, and an edge from D to B with a weight of 4. If, in this implementation where edges are combined, the clusters including nodes A and C were merged, the edge from A to B and the edge from C to B would be combined with a combined edge weight of 5. Then if node B were the next highest weight node, node B would be combined with the A+C cluster because the edge from A+C to B has a weight 5 which is larger than the weight 4 of the edge from D to B, the next highest weight edge.

In some implementations, when clusters are combined the individual edges between nodes inside that cluster and outside that cluster are not modified. In an example where edges are not combined upon merging clusters, and where the call graph from the previous example is used, the clusters comprising nodes A and C may be merged. In this case, the edge from A to B and the edge from C to B would each be maintained, without a combined edge being created. In this example, if node B were the next highest weight node, node B would be combined with the cluster comprising node D because the edge from D to B has a weight 4 which is larger than the weight 3 of the edge from A to B, the next highest weight edge.

At block 612, if a most likely eligible cluster was found at block 610, process 600 continues to block 614, otherwise, process 600 continues to block 616. At block 614 the cluster including the most likely eligible cluster is merged with the cluster including the current node. In some implementations, an order within each cluster is maintained. This order can be that the nodes from the cluster containing the node corresponding to the calling function, i.e. the cluster found at block 610, are ordered before the nodes from the current cluster. Maintaining this ordering within clusters can improve performance in caching, such as an instruction cache or TLB. Process 600 then continues to block 616.

At block 616, process 600 determines whether all the nodes from the call graph have been operated on by the loop from block 610 through 618. If not, process 600 continues to block 618 where the next highest weighted node is set as the current node for processing by the loop between blocks 610 and 618. Otherwise, process 600 continues to block 620. At block 620 indications of the call graph clusters are returned. Process 600 then continues to block 622, where it ends.

Figure 7:
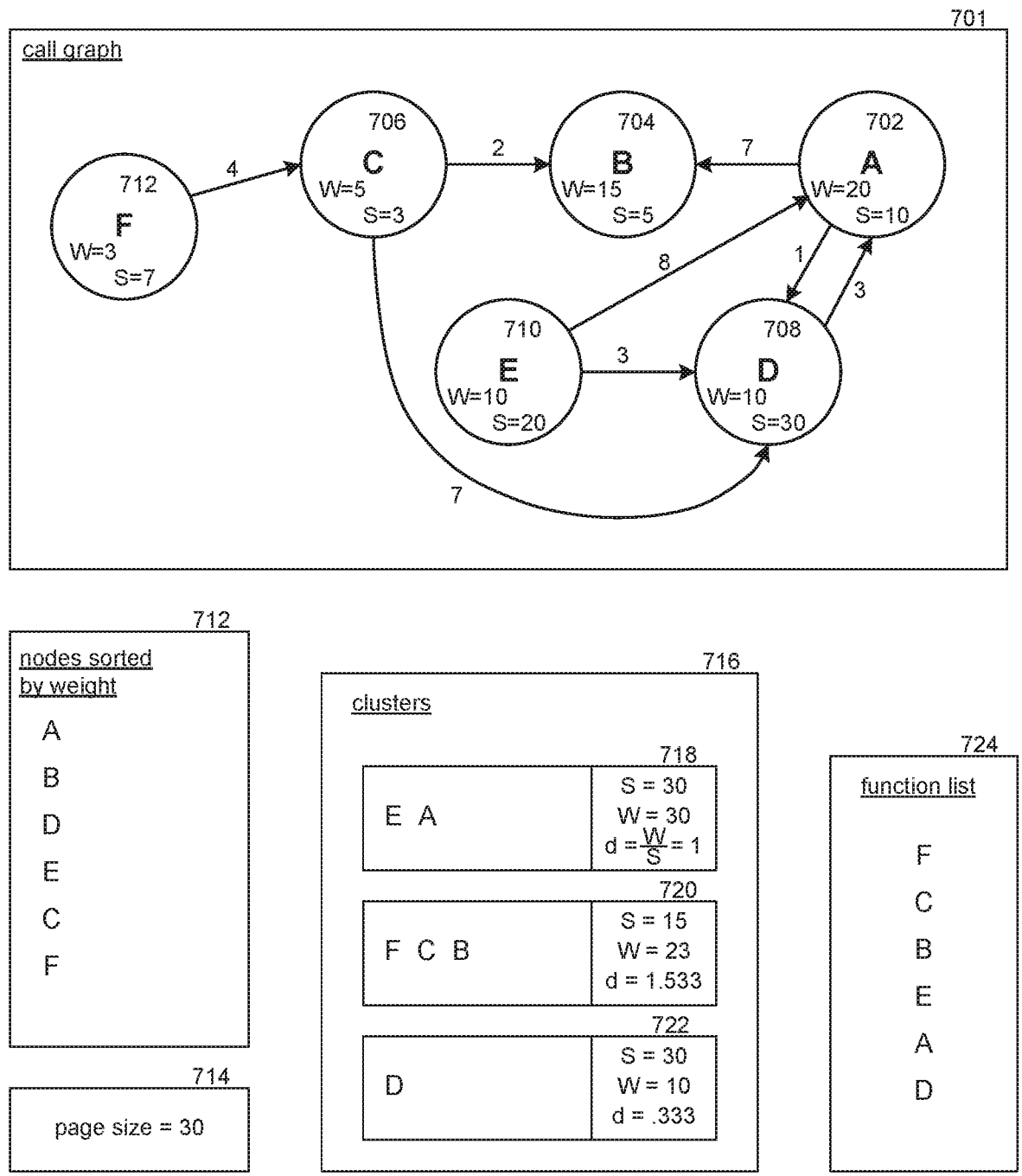
FIG. 7 is an example illustrating the determination of a list of functions for placement in compiled code based on a given function call graph.

FIG. 7 is an example 700 illustrating the determination of a list of functions for placement in compiled code based on a given function call graph. Example 700 includes a given function call graph 701 created from a log of function calls. Function call graph 701 includes nodes 702-712, each with a node weight (w) and a size (s) of an associated function. Function call graph 701 also includes edges between some of the nodes 702-712, marked with associated edge weights.

From function call graph 701, a list of nodes 712 can be created by sorting the nodes based on their node weight values. Node A has a weight of 20, the highest weight, so it is first in the list of nodes 712; node F has a weight of 3, the lowest weight, so it is last in the list of nodes 712. A page size 714 is known; the known page size is 30.

Using function call graph 701 and list of nodes 712, clusters 716 can be built. The process for building clusters 716 could proceed as follows. Each node would be added to its own cluster. The highest weight node, node A, would be set as the current node. The most likely eligible caller cluster would be found as the cluster comprising node E because the edge from node E 710 to node A 702 is the highest weight incoming edge to node A 702 from an eligible cluster. Node E 710 is an eligible cluster because the sum of the weights for the nodes in the cluster including the current node (node A size=10) and the weights for the nodes in the prospective cluster to be added (node E size=20) is 30, which does not exceed the threshold page size of 30. This results in cluster 718 with a total function size of 30, a weight of 30, and a density value, which is the weight/size of 1.

The next highest weight node, node B, is now set as the current node. At this point, cluster 720 only includes node B. While cluster 718 has the highest incoming edge weigh to the current node, cluster 718 is not an eligible cluster because adding the size of the cluster including the current node, 5, to the size of cluster 718, 30, exceeds the threshold page size of 30. The cluster with an incoming edge to the current node with the next highest weight value is the cluster comprising node C. This is an eligible cluster, thus the cluster including node C is merged with the cluster including the current node 720 such that cluster 720 now includes nodes B and C.

Node D is the next highest weight node, so node D is set as the current node. Node D has a size of 30, which is the page size, so no other clusters can be eligible clusters. Thus, no merging occurs and the cluster including node D, cluster 722, remains a single cluster node. Cluster 722 has a final size of 10, a weight of 10, and thus a density of 1. Node E is the next highest weight node so node E is set as the current node. Node E has no incoming edges so no merging occurs.

Node C is the next highest weight node, so node C is set as the current node. The only incoming edge to node C is from node F. The sum of the sizes of the cluster including node C, cluster 720 with a size of 8, with the size of the cluster 720 including node C is 15. Thus, the cluster including node F is an eligible cluster, and is merged to form cluster 720 including nodes B, C, and F. Cluster 720 now has a final size of 15, a weight of 23, and a density of 1.533.

Node F is the last node on the sorted node list 712. Node F has no incoming edges, thus no further merging occurs with cluster 720, the cluster including node F.

All of the nodes in the list of nodes 712 have now been operated on. List of clusters 716 can now be sorted by their density (d) values. Finally, function list 724 can be created based on the sorted list of clusters 716.

Several embodiments of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

I claim:

1. A method for assigning relative function locations within executable code, the method comprising:
   organizing a plurality of functions of a server-based application into a plurality of pages;
   responding, by one or more server computing devices, to requests received over the Internet from a plurality of users of the server-based application by executing one or more of the plurality of functions from a corresponding one of the plurality of pages;
   profiling, while responding to the requests, executions of the one or more of the plurality of functions caused by the requests from the plurality of users;
   compiling, based at least in part on profiling the execution of the one or more of the plurality of functions, a function call log comprising identifications of multiple pairs, each pair comprising a called function within the one or more of the plurality of functions and a calling function within the one or more of the plurality of functions that called the called function;
   building a call graph that is based on the function call log by:
      defining a node for each called function and for each calling function in the function call log;
      defining, for each pair in the function call log, an edge from the node for a corresponding calling function to the node for a corresponding called function; and
      incrementing, for each pair in the function call log, an edge weight value associated with the edge;
   defining at least a first cluster and a second cluster within the call graph by merging at least two nodes of the call graph into the first cluster, wherein selection of the at least two nodes, other than a specific node of the at least two nodes, is based on a function corresponding to the specific node having called a function corresponding to one other of the at least two nodes;
   merging at least one node of the call graph into the second cluster;
   generating an ordered list of functions by sorting the defined node clusters;
   reorganizing, based at least in part on the ordered list of functions, the plurality of functions of the server-based application into the plurality of pages; and
   responding, by the one or more server computing devices after reorganizing the plurality of functions, to subsequent requests received via the Internet from the plurality of users by executing the one or more of the plurality of functions from a different corresponding one of the plurality of pages.

2. The method of claim 1, wherein each node corresponding to a called function in the call graph is associated with a node weight that is based on an amount of processing performed for the called function while responding to the requests.

3. The method of claim 2, wherein no node of the call graph is merged into more than one cluster, and wherein nodes are merged into a particular cluster by analyzing each node of the call graph in order of node weight.

4. The method of claim 2, wherein:
   defining at least the first cluster and the second cluster is further performed by sorting the nodes of the call graph based on their associated node weight.

5. The method of claim 1, wherein selection of a particular node of the at least two nodes is further based on a determination that the edge weight for an edge from the particular node to another node already selected for the first cluster is higher than the weight for all other incoming edges for the other node already selected for the first cluster.

6. The method of claim 1, wherein selection of a particular node of the at least two nodes is further based on a determination that the addition of the particular node to the first cluster will not increase a total function size value for the first cluster above a threshold value.

7. The method of claim 1, wherein selection of a particular node of the at least two nodes is further based on:
a determination that the particular node is in an eligible cluster; and
a determination that the edge weight for an edge from the particular node to another node already selected for the first cluster is higher than the edge weight for all other incoming edges associated with other eligible clusters;
wherein each eligible cluster is a cluster made up of nodes to be added, such that the sum of the sizes of the functions associated with the nodes to be added in that eligible cluster added to sum of the sizes of the functions associated with the nodes in the first cluster result in a total function size that does not exceed a threshold value.

8. The method of claim 2, wherein an indicator of the amount of processing of each called function is a runtime of the called function.

9. The method of claim 1, wherein:
the server-based application comprises a live distributed social-networking application; and
the requests received over the Internet from the plurality of users comprise requests to perform one or more of:
share links on the live distributed social-networking application;
request web pages of the live distributed social-networking application; or
send messages on the live distributed social-networking application.

10. The method of claim 1, wherein generating the ordered list of functions by sorting the defined node clusters comprises:
computing, for each node cluster, a cluster density,
wherein each cluster density is computed by dividing A) an average amount of time spent during an execution of the functions associated with nodes in that cluster by B) a number of instructions from the functions associated with nodes in that cluster.

11. A computer memory storing instructions that, when executed by a computing device, cause the computing device to perform operations for assigning relative function locations within executable code, the operations comprising:
organizing a plurality of functions of a server-based application into a plurality of pages;
responding, by one or more server computing devices, to requests received over the Internet from a plurality of users of the server-based application by executing one or more of the plurality of functions from a corresponding one of the plurality of pages;
profiling, while responding to the requests, executions of the one or more of the plurality of functions caused by the requests from the plurality of users;
compiling, based at least in part on profiling the execution of the one or more of the plurality of functions, a function call log comprising identifications of multiple pairs, each pair comprising a called function within the one or more of the plurality of functions and a calling function within the one or more of the plurality of functions that called the called function;
building a call graph that is based on the function call log, the call graph including a node for each called function and for each calling function in the function call log;
defining at least a first cluster and a second cluster within the call graph by:
merging at least two nodes of the call graph into the first cluster, wherein selection of the at least two nodes, other than a specific node of the at least two nodes, is based on a function corresponding to the specific node having called a function corresponding to one other of the at least two nodes; and
merging at least one node of the call graph into the second cluster;
generating an ordered list of functions by sorting the defined node clusters;
reorganizing, based at least in part on the ordered list of functions, the plurality of functions of the server-based application into the plurality of pages; and
responding, by the one or more server computing devices after reorganizing the plurality of functions, to subsequent requests received via the Internet from the plurality of users by executing the one or more of the plurality of functions from a different corresponding one of the plurality of pages.

12. The computer memory of claim 11, wherein generating the ordered list of functions by sorting the defined node clusters comprises:
computing, for each node cluster, a cluster density,
wherein each cluster density is computed by dividing A) an average amount of time spent during an execution of the functions associated with nodes in that cluster by B) a number of instructions from the functions associated with nodes in that cluster.

13. The computer memory of claim 11, wherein selection of a particular node of the at least two nodes is further based on a determination that the addition of the particular node to the first cluster will not increase a total function size value for the first cluster above a page size.

14. The computer memory of claim 11, wherein the call graph is built by:
defining a node for each called function and for each calling function in the function call log; and
defining, for each pair in the function call log, an edge from the node for a corresponding calling function to the node for a corresponding called function;
wherein each edge in the call graph is associated with an edge weight indicating a number of times the corresponding calling function called the corresponding called function.

15. The computer memory of claim 11, wherein selection of a particular node of the at least two nodes is further based on:
a determination that the particular node is in an eligible cluster; and
a determination that the edge weight for an edge from the particular node to another node already selected for the first cluster is higher than the edge weight for all other incoming edges associated with other eligible clusters;
wherein each eligible cluster is a cluster made up of nodes to be added, such that the sum of A) the sizes of the functions associated with the nodes to be added in that eligible cluster and B) of the sizes of the functions associated with the nodes in the first cluster result in a total function size that does not exceed a threshold value.

16. A system for assigning relative function locations within executable code, the system comprising:
- a memory;
- one or more processors;
- a page organizer configured to organize a plurality of functions of a server-based application into a plurality of pages;
- one or more server computing devices configured to respond to requests received over the Internet from a plurality of users of the server-based application by executing one or more of the plurality of functions from a corresponding one of the plurality of pages;
- a call graph generator configured to:
  - profile executions of the one or more of the plurality of functions caused by the requests from the plurality of users;
  - compile, based at least in part on profiling the execution of the one or more of the plurality of functions, a function call log comprising identifications of multiple pairs, each pair comprising a called function within the one or more of the plurality of functions and a calling function within the one or more of the plurality of functions that called the called function; and
  - build a call graph that is based on the function call log by:
    - defining a node for each called function and for each calling function in the function call log;
    - defining, for each pair in the function call log, an edge from the node for a corresponding calling function to the node of a corresponding called function; and
    - incrementing, for each pair in the function call log, an edge weight value associated with the edge;
- a cluster builder configured to define at least a first cluster and a second cluster within the call graph by:
  - merging at least two nodes of the call graph into the first cluster, wherein selection of the at least two nodes, other than a specific node of the at least two nodes, is based on a function corresponding to the specific node having called a function corresponding to one other of the at least two nodes; and
  - merging at least one node of the call graph into the second cluster; and a cluster sorter configured to generate an ordered list of functions by sorting the defined node clusters, wherein:
- the page organizer is further configured to reorganize, based at least in part on the ordered list of functions, the plurality of functions of the server-based application into the plurality of pages; and
- the one or more server computing devices configured to respond, after the plurality of functions are reorganized, to subsequent requests received via the Internet from the plurality of users by executing the one or more of the plurality of functions from a different corresponding one of the plurality of pages.

17. The system of claim 16, wherein the cluster builder is further configured to define at least the first cluster and the second cluster by:
sorting the nodes of the call graph based on their associated node weight.

18. The system of claim 16, wherein the cluster sorter sorts node clusters by assigning, for each node cluster, a cluster density, wherein each cluster density is computed by dividing A) an average amount of time spent during an execution of the functions associated with nodes in that cluster by B) a number of instructions from the functions associated with nodes in that cluster.

19. The system of claim 16, wherein selection, by the cluster builder, of a particular node of the at least two nodes is further based on a determination that adding the particular node to the first cluster will not increase a total function size value for the first cluster above a page size.

20. The system of claim 16, wherein:
the cluster builder selects a particular node of the at least two nodes based on:
  - making a determination that the particular node is in an eligible cluster; and
  - making a determination that the edge weight for an edge from the particular node to another node already selected for the first cluster is higher than the edge weight for all other incoming edges associated with other eligible clusters;
wherein each eligible cluster is a cluster made up of nodes to be added, such that the sum of A) the sizes of the functions associated with the nodes to be added in that eligible cluster and B) the sizes of the functions associated with the nodes in the first cluster, result in a total function size that does not exceed a threshold value.

\* \* \* \* \*